Figure 1:
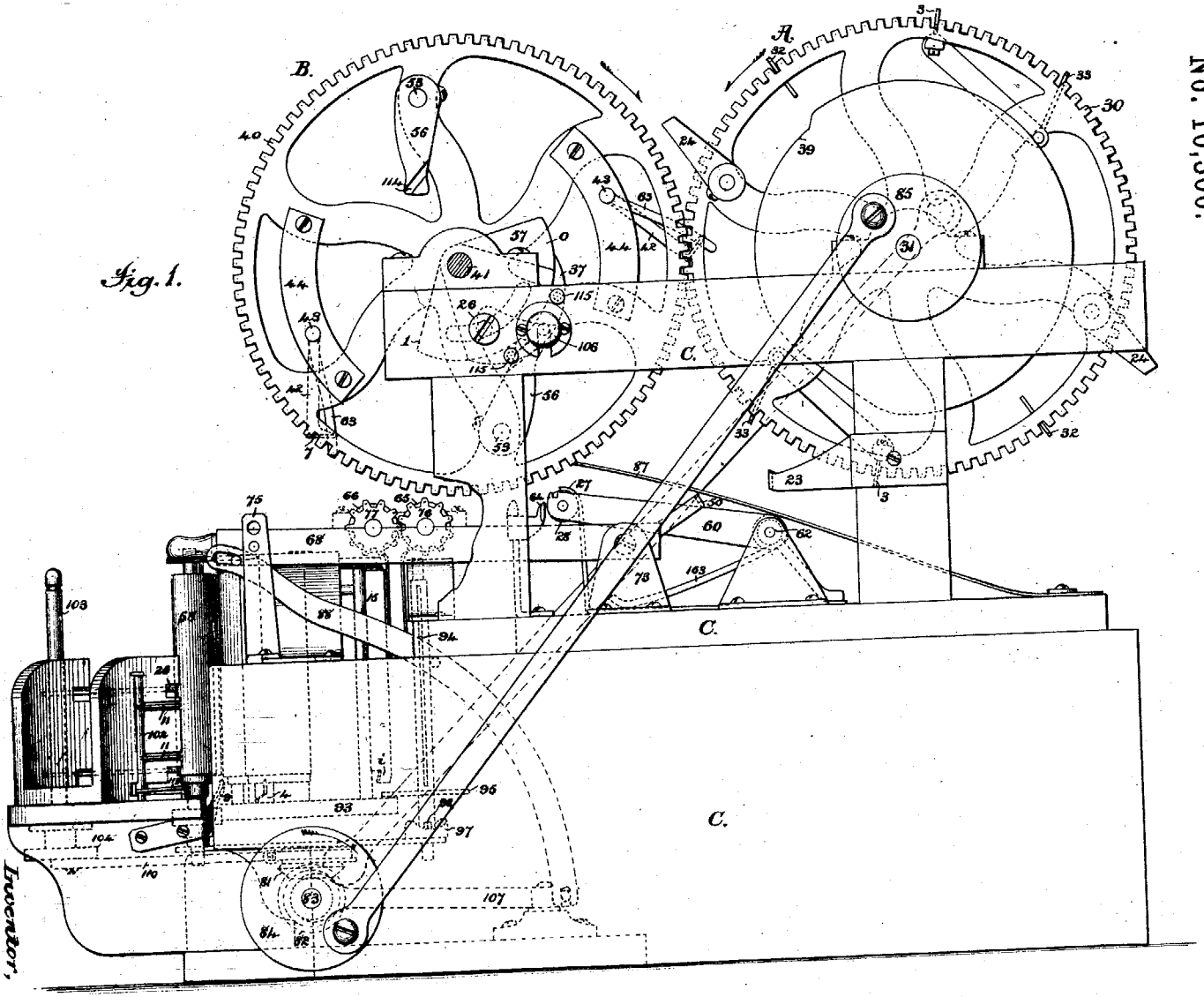

7 Sheets—Sheet 1.

L. C. CROWELL,

Assignor to R. Hoe & Co.

PAPER FOLDING MACHINE.

No. 10,300. Reissued Apr. 3, 1883.

Witnesses,
Geo. H. Graham
John Bolschka

Inventor,
Luther C. Crowell,
by Munson & Philipp,
Att'ys.

7 Sheets—Sheet 2.

L. C. CROWELL,

Assignor to R. Hoe & Co.

PAPER FOLDING MACHINE.

No. 10,300. Reissued Apr. 3, 1883.

Attest,
Geo. H. Graham
John W. Boleschka

Inventor,
Luther C. Crowell,
by Munson & Philipp,
Attys.

L. C. CROWELL,

Assignor to R. HOE & Co.

PAPER FOLDING MACHINE.

No. 10,300. Reissued Apr. 3, 1883.

Attest,
Geo. H. Graham
John Bolschka

Inventor,
Luther C. Crowell,
by Munson & Philipp,
Att'ys.

7 Sheets—Sheet 4.

L. C. CROWELL,

Assignor to R. Hoe & Co.

PAPER FOLDING MACHINE.

No. 10,300. Reissued Apr. 3, 1883.

Witnesses,
Geo. H. Graham
John Boleschka.

Inventor,
Luther C. Crowell,
by Munson & Philipp
Attys.

L. C. CROWELL,

Assignor to R. HOE & Co.

PAPER FOLDING MACHINE.

No. 10,300. Reissued Apr. 3, 1883.

Attest,
Geo. H. Graham
John Polischka

Inventor,
Luther C. Crowell,
by Munson & Philipp
Attys.

L. C. CROWELL,

Assignor to R. Hoe & Co.

PAPER FOLDING MACHINE.

No. 10,300. Reissued Apr. 3, 1883.

Attest,
Geo. H. Graham
John Bolesehka

Inventor,
Luther C. Crowell,
by Munson & Philipp
Attys.

L. C. CROWELL,

Assignor to R. HOE & Co.

PAPER FOLDING MACHINE.

No. 10,300. Reissued Apr. 3, 1883.

Witnesses,

Geo. H. Graham

John Boleschka.

Inventor,

Luther C. Crowell, by Munson & Philipp

Attys.

UNITED STATES PATENT OFFICE.

LUTHER C. CROWELL, OF BOSTON, MASSACHUSETTS, ASSIGNOR TO R. HOE & CO., OF NEW YORK, N. Y.

PAPER-FOLDING MACHINE.

SPECIFICATION forming part of Reissued Letters Patent No. 10,300, dated April 3, 1883.

Original No. 186,309, dated January 16, 1877. Application for reissue filed July 7, 1882.

*To all whom it may concern:*

Be it known that I, LUTHER C. CROWELL, of Boston, county of Suffolk, and Commonwealth of Massachusetts, have invented Improvements in Paper-Folding Machines, of which the following is a specification.

This invention relates to mechanism for folding and delivering paper, and is especially adapted to fold paper issuing from a cylinder or a web-perfecting printing-machine. The paper passing through the printing-machine in a web or continuous length from a roll, and being taken by the folding mechanism, is folded in a direction transverse to its length and cut, and is then folded in an opposite direction, ready for transmission through the mail, or for other purposes.

This invention consists in the combination, with a cylinder or carrier and a hinged or pivoted swinging folding-blade, of a stop or deflector to throw outward the edge of such folding-blade to fold and direct a piece of paper into the bite of a pair of feeding-rollers; in the combination, with fold-nipping mechanism and its carrier, of supplement-cutters to sever the folded edge of the paper to produce half-sheets, as for supplements; in the combination, with mechanism adapted to fold a sheet in a line parallel with the axis of the folding cylinder or carrier, of an adjustable folding-roller-carrying frame which may be thrown into or out of operation when it is desired to form a second fold in a once-folded paper; in a hinged or pivoted swinging folding-blade and a feeding device arranged to form a second fold in a sheet of paper; in combination with a guide, a rotating folding-blade and mechanism working in connection therewith to form a fold substantially at right angles to the second fold, as set forth; and in various combinations and constructions of mechanisms too fully hereinafter explained to need further preliminary description.

Figure 2:
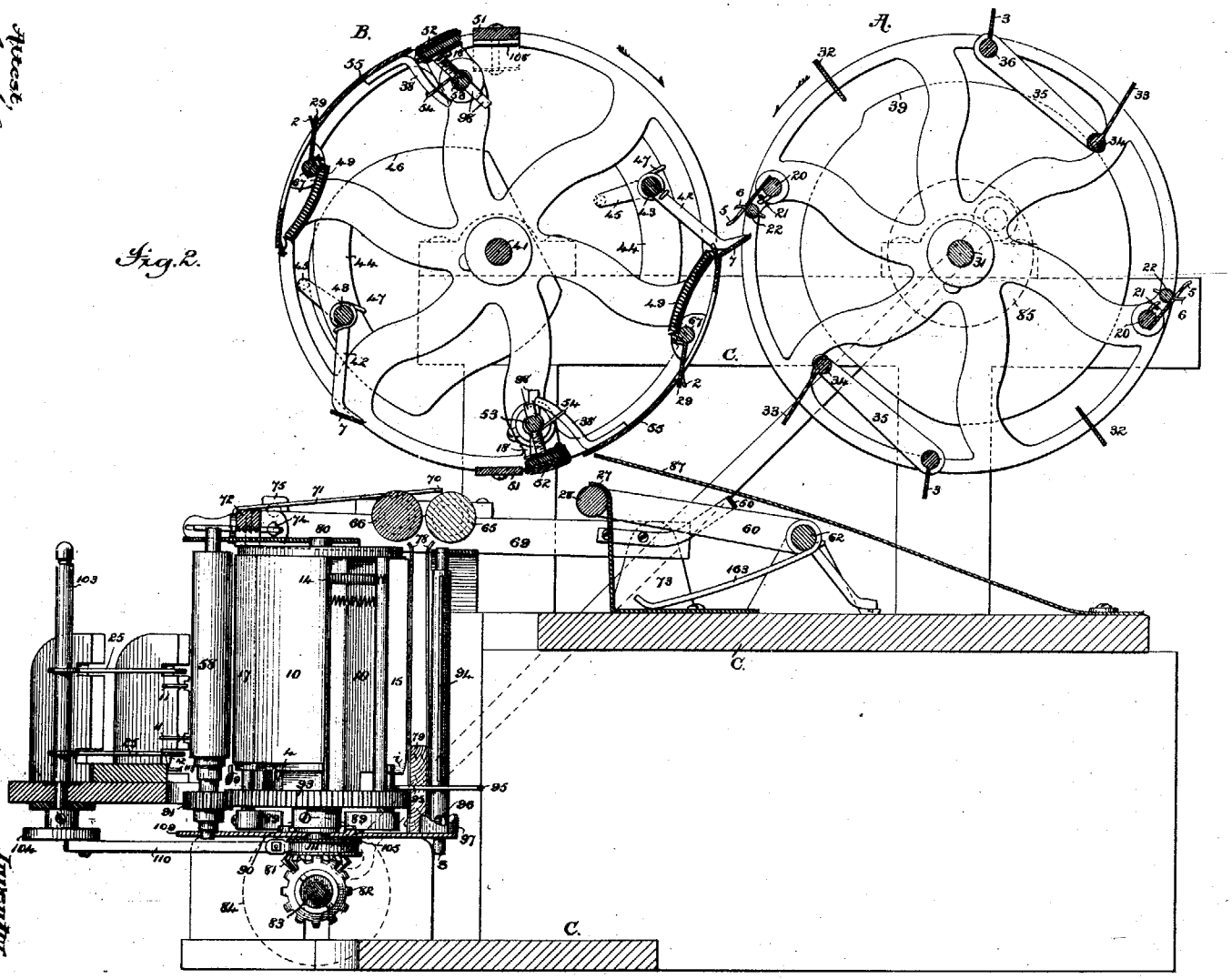
Figure 3:
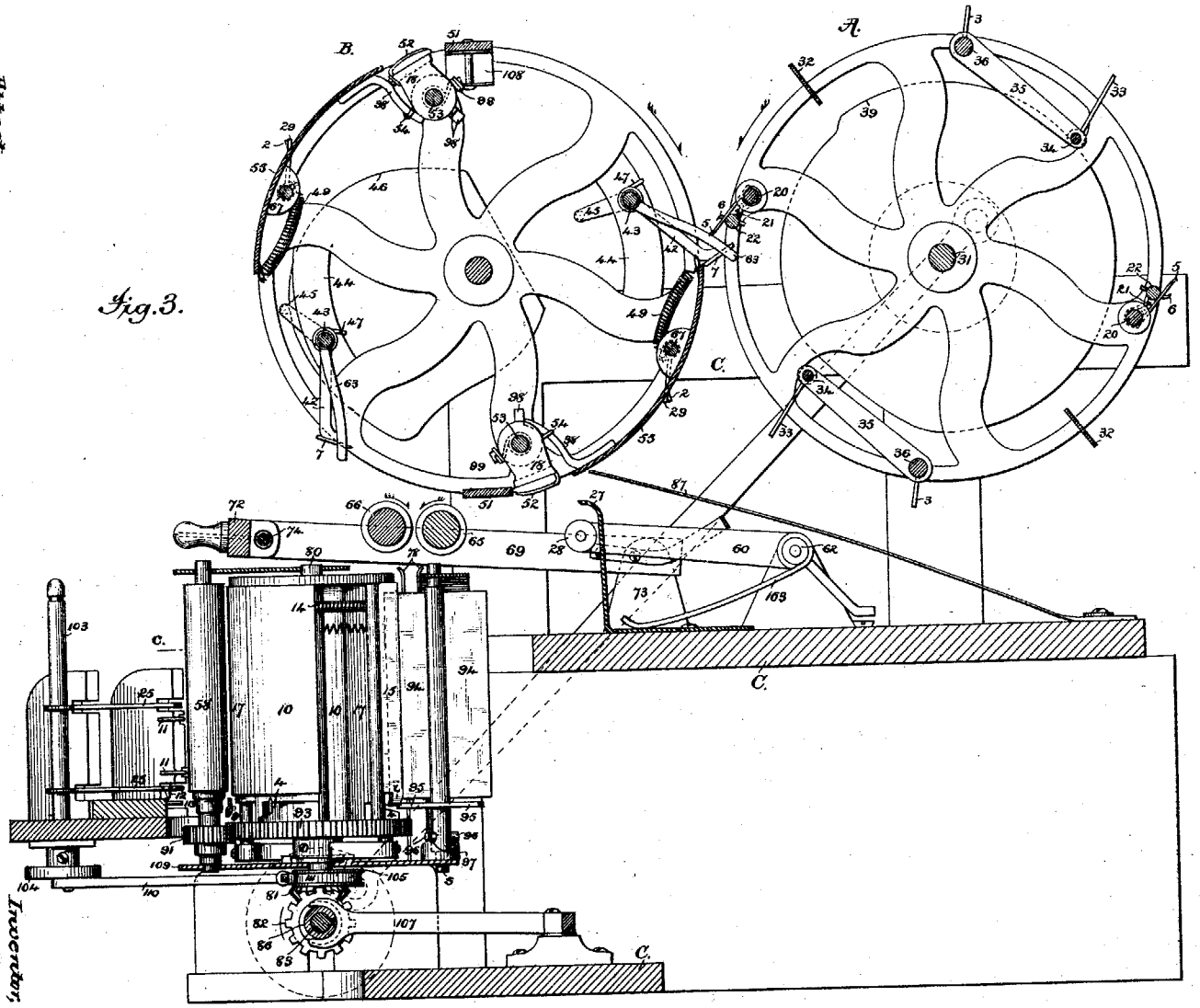
Figure 4:
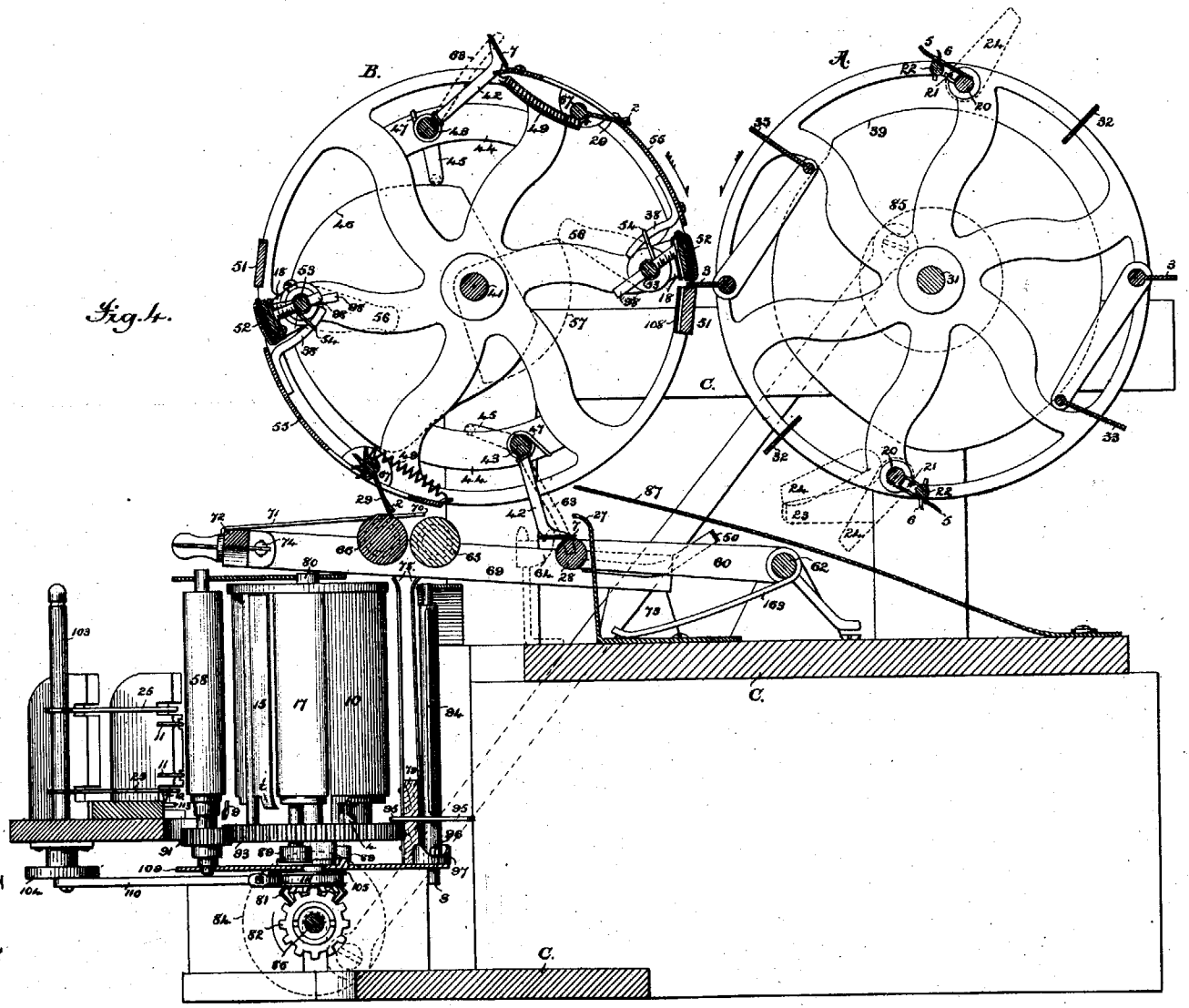
Figure 5:
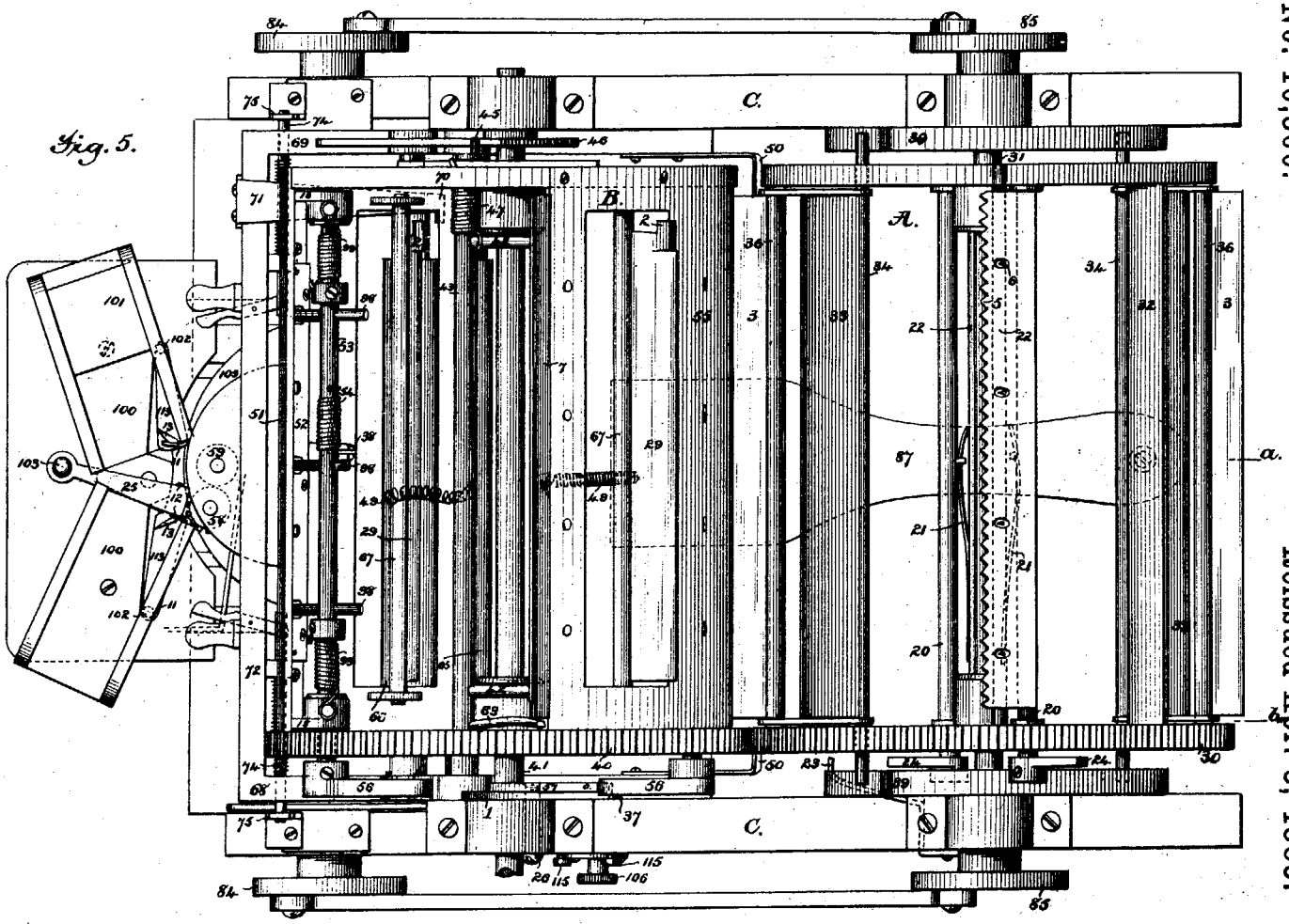
Figure 7:
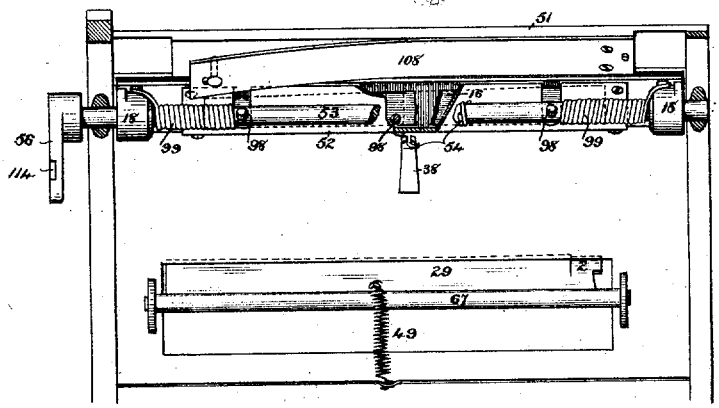
Figure 6:
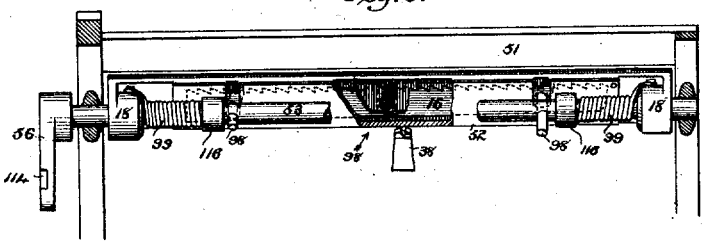
Figure 12:
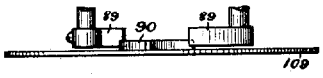
Figure 11:
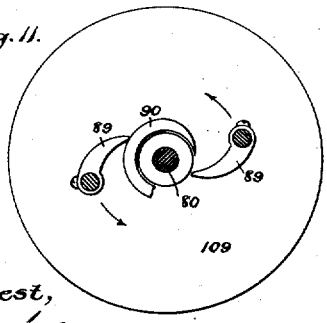
Figure 10:
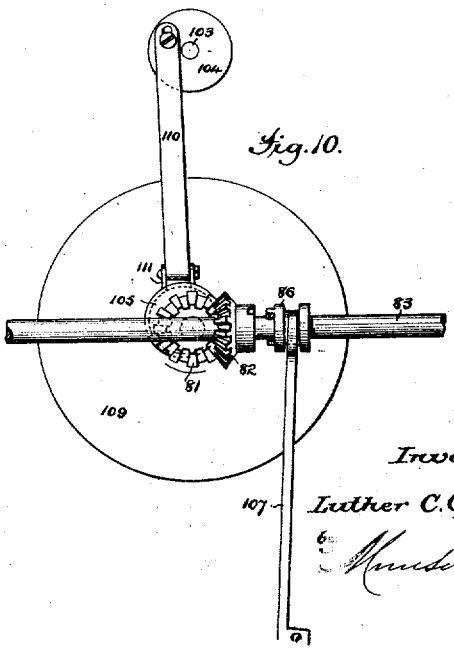
Figure 8:
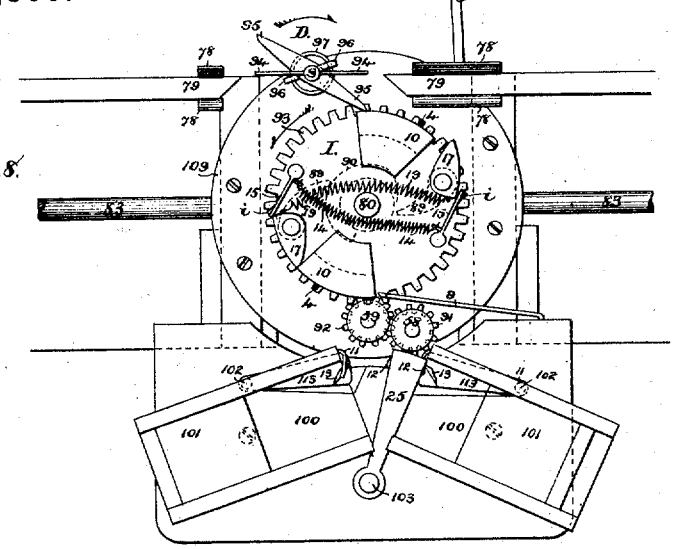
Figure 9:
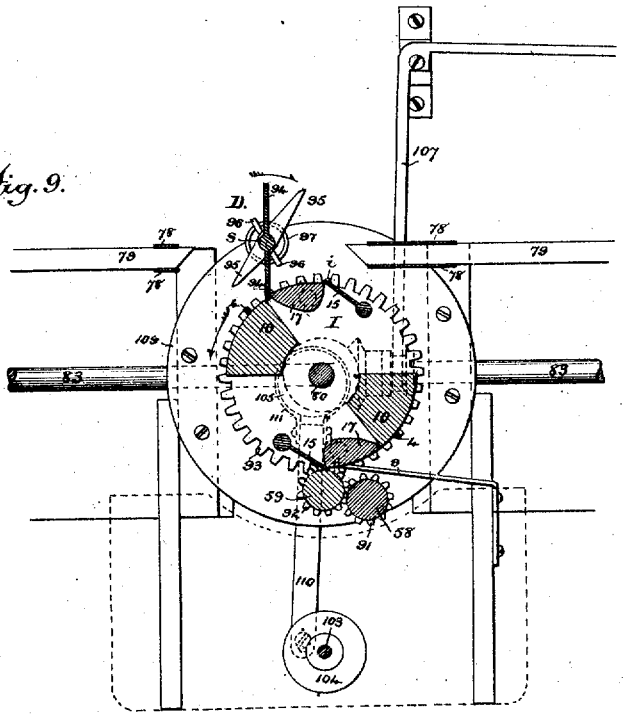

In the drawings, Figure 1 is a side elevation of a folding mechanism provided with my inventions; Fig. 2, a longitudinal section thereof on the line *a* of Fig. 5, except through the vertical folding mechanism, which is shown in side elevation, the mechanisms being in the same position as in Fig. 1. Fig. 3 is a similar view, but taken on the line *b* of Fig. 5, thus representing some important parts in elevation. Fig. 4 is a similar view, but taken on the line *a* of Fig. 5, the mechanisms being shown in a different position of their operation. Fig. 5 is a plan view of the parts in the positions shown in Fig. 4. Fig. 6 is a detail view of one of the supplement-cutting mechanisms. Fig. 7 is a similar representation of the other supplement-cutting mechanism. Fig. 8 is a plan view of the vertical folding mechanism with the top plate removed. Fig. 9 is a cross-section taken in a horizontal plane through the vertical folding mechanism on the line *c* of Fig. 3, the parts being in a like position. Fig. 10 is a bottom plan view, showing the driving mechanisms of the vertical folding apparatus. Fig. 11 is a sectional plan view, showing the devices for operating the movable jaws of the vertical folding apparatus, and Fig. 12 is an elevation of the same. In Figs. 1 and 2 the vertical folding mechanism is shown as thrown out of conjoint action with the horizontal folding mechanism, while in Figs. 3 and 4 the vertical folding mechanism is shown as adjusted for co-operation with said horizontal folding mechanism.

The rotating cylinders or carriers A and B are mounted upon shafts 31 41, that are supported in bearings provided on a frame, C, of any suitable construction adapted to properly sustain the working parts. The shaft 31, in this instance, is the driven shaft, and the cylinders A and B are connected and rotated in unison by means of toothed wheels 30 and 40, mounted respectively upon their shafts 31 41.

When the folding-machine is to be employed to fold newspapers or other printed sheets issuing from a printing-machine, the cylinder A is placed at the delivery-end of the printing-machine, with its axis parallel with the axis of the printing-machine cylinders, and the paper passing from the printing-machine is led onto said cylinder A and impaled on the points or holding-pins 6, that project at opposite points from rods 22 through slots in the movable cutting-blades 5. There are two of these blades 5 hung on shafts 20 at opposite points in the cylinder A, their edges being preferably serrated, and each blade acts as one member of a cutting mechanism, the other member thereof being a fly, 7, two of which are pivoted to the cylinder B, so as to project from its peripheral line. In Figs. 2 and 3 one set of the holding-pins 6 are shown as just coming into position to engage and impale the paper web (not shown) issuing from the printing-machine. The other set of these pins 6 and the cutting-blade 5, through which they protrude, are in the positions they occupy immediately after the web of paper is severed. The web of paper, prior to its being severed, is stretched from nipping-jaws 51 52, with which the cylinder B is provided, between the cylinders A B, over the latter, and back to the printing-machine, thus being impaled by one set of the pins 6, and it is severed transversely, so as to detach a sheet from its leading end, by the action of the projecting edge of a fly, 7, which forces it past the serrated edge of the cutting-blade 5, and thus divides it, leaving the detached end of the web securely held upon the pins 6. Assuming that the holding-pins 6 shown at the right-hand side of the cylinder A in Figs. 2 and 3 have just entered the paper web, the rotation of said cylinder in the direction of the arrow will carry the web (which in the practical operation is already impaled and held by the holding-pins 6 shown at the left-hand side of the cylinder) onto the cylinder and lay it over the fixed supporting-bar 32, the fixed folding-blade 3 and the slacker-bar 33. These slacker-bars 33, of which there are two, are fixed to opposite shafts, 34, that are carried in rock-arms 35, hung so as to vibrate on the rods 36, that fixedly support the folding-blades 3 in the heads of the cylinder A, which shafts 34 are provided with projecting ends (see Figs. 1 and 5) that rest upon stationary cams 39, (one at each side of the machine.) These cams 39 are provided with depressed parts, which allow the slacker-bars each to withdraw to its innermost position just as a folding-blade, 3, begins to enter between the nipping-jaws 51 52.

In order to fold a sheet or newspaper centrally, each folding-blade 3 is placed on the cylinder A midway between the two sets of holding-pins 6, which pins enter that portion of a printed sheet constituting its margin. These holding-pins and folding-blades will be placed at such distances apart upon the cylinder as to hold and fold the paper at the desired places. In the present instance the cylinder A carries two sets of holding-pins 6, two movable cutting-blades 5, two supporting-bars 32, two folding-blades 3, and two slacker-bars 33, and that the cylinder B carries a fly, 7, at opposite points of its circumference, and that about equidistant therefrom, and at opposite points, it is provided with sets of nipping-jaws 51 52. When, during the rotation of the cylinders A B, a cutting-blade, 5, reaches a point of coaction with a projecting fly, 7, the web of paper will be severed transversely, and the leading end of the web impaled on the holding-pins 6 will be held thereby and be carried on the surface of the cylinder A toward the lowest point of said cylinder. During this rotation of the cylinders a folding-blade, 3, comes opposite to a pair of open nipping-jaws, 51 52, and presses the paper overlaying it between said jaws, thus doubling or folding the paper transversely, a slacker-bar, 33, being simultaneously withdrawn to slacken or give up the necessary quantity of paper to constitute the fold, as in Fig. 4. The movable nipping-jaw 52 is now closed toward the stationary nipping-jaw 51, and said nipping-jaws grasp the fold firmly between them. As these jaws fairly grasp the said fold a rock-arm, 24, fast on one end of the shaft 20 of the movable cutting-blade 5, engages a tappet, 23, Fig. 4, projecting from the side frame, C, and rocks said cutting-blade outward to strip the leading end of the paper off from the holding-pins 6. This cutting-blade is then quickly restored to its normal position by means of a spring, 21, that is fixed at one end to the rod 22, and bears with its free end under an arm projecting from the shaft 20 of the blade. The nipping-jaws 51 52 hold the folded portion of the paper; but the free leading end thereof, just discharged from the holding-pins by the movement of the cutting-blade, drops upon the surface of a supporting-plate, 87, (preferably composed of a sheet or strip of light spring metal,) the forward end of which plate guides such free end up to the surface of the cylinder B and away from a sheet-holding mechanism, composed in this instance of a curved lip, 27, and a yielding roller, 28. When the cylinder B, carrying the paper by its fold, moves far enough in the direction of its arrow to bring a cutting-blade, 5, and a fly, 7, together the paper web is again severed, and the nipping-jaws 51 52 then hold a newspaper or sheet having two free ends, both of which are held by the supporting-plate 87 ~~up against~~ the smooth face-plate 55 of the cylinder B and lapped or laid evenly together.

Each fly 7, as illustrated, is a plate-carrier at the ends of arms 42, projecting from a shaft, 43, that is journaled in plates 44, which shaft has connected with it at one end a spring, 47, the tendency of which is to hold the fly against the rear edge of the face-plate 55. The shaft 43 has attached to it a rock-arm, 63, Figs. 1 and 4, that, as the cylinder B rotates, strikes a stop, 64, just as the two free ends of the newspaper or sheet, still held by their fold between the nipping-jaws 51 52, are passing between the fly 7 and the yielding roller 28 of the sheet-holding mechanism; and when the arm 63 engages the stop 64 the fly-shaft is turned, (the cylinder continuing to move,) and the fly 7, thrown out away from the cylinder in a tangential direction, as in Fig. 4, presses the free ends of the sheet down onto the roller 28, or on other folded sheets or a pile of folded sheets previously deposited there. As the fly, after having depressed the roller 28, rises and releases the free ends of the sheet, the said ends are pressed upward by the roller 28 and caught and held between its surface and that of the lip 27, said roller 28 being hung in arms 60 61, pivoted on a shaft, 62, which is seated upon a spring, 163, that is fast to it and bears upon the bed-plate of the frame C. This holding mechanism thus operates to hold each sheet and arrest its onward movement, said sheet being released in proper time from the hold of the nipping-jaws 51 52.

At the opposite end of the fly-shaft 43 from that shown in Fig. 1 it is provided with a rock-arm, 45, Figs. 2 and 4, that, as the fly rises from the roller 28 and leaves the sheet, engages a fixed cam, 46, and permits its axis to turn gradually under the action of its spring 43, and thus carry the fly into its normal position of resting upon the rear end of the face-plate 55, when it is again ready to act as a member of the cutting mechanism.

The operation of the mechanisms as thus far described will deposit sheets once folded in a pile, and their folded edges will be parallel or uniform, or substantially so, whereby they may be carried away in a pile, ready for rapid hand-folding.

The sheet-nipping mechanism is composed of a stationary jaw, 51, extending across the cylinder B, and of a movable jaw, 52, carried at the ends of arms 18, projecting from a shaft, 53, and preferably faced with india-rubber or leather. Each movable jaw 52 is moved away from its companion—the stationary jaw 51—by means of a spiral spring, 54, coiled about and fastened at one end to the shaft 53, its other end being secured to an arm, 38, projecting from the rear of the face-plate 55. (See Figs. 2 and 5.) These jaws are thus normally held open, or in position to receive a folding-blade between them. At the proper time for a nipping-jaw, 52, to close onto and grasp the fold of the paper presented by the folding-blade 3 a rock-arm, 56, Figs. 1, 5, and 6, fast on the end of its shaft 53, meets a stationary cam, 57, and is thereby rocked forward, so as to carry the jaw 52 toward the jaw 51, and thus grasp the fold of the paper between them as the folding-blade 3 is withdrawn therefrom, Fig. 4. This rock-arm 56 bears upon the cam 57 as long as it is necessary to hold the folded paper, and when the same is to be released the rock-arm passes off from the cam and permits the spring 54 to vibrate the movable jaw 52, and thus open said jaws. This cam 57 is composed of two plates—an auxiliary movable plate, 1, placed alongside its main fixed plate *o*. The auxiliary plate 1 has a curved slot, through which passes the set-screw 26, that is tapped into the main plate *o* to hold the same stationary. The auxiliary plate 1 may be moved on the shaft 41, and be fixedly adjusted by the screw 26 to increase the bearing-surface of said cam 57, and thus extend the time during which a rock-arm shall bear upon it to hold the jaws 51 52 in their closed position.

In case half-sheets or supplements are to be delivered, it is only necessary to set up the types to print half-sheets, and then cut and fold as has been described; but to divide the full sheets into half-sheets there is arranged, in connection with each of the nipping-jaws, a supplement-cutting mechanism constructed as follows, (see Figs. 2, 5, 6, and 7:) There are two forms of supplement-cutting mechanisms shown herein, the details of one being illustrated in Fig. 6 and the other in Fig. 7. In each form a cutting-blade, as 16, guided in an opening made for its reception in such movable nipping-jaw 52, is attached to the nipping-jaw shaft 53 by arms 98. To provide for the operation of these cutting-blades 16, the arms 18 of the movable nipping-jaws are loosely hung on the shaft 53, and connected with it by means of spiral springs, as 99, fast at one end in a hole in the shaft, or to a collar, 116, fixed upon the shaft, and at the other to the arms 18, Figs. 3, 5, and 6, so that the said arms 18 may move a short distance about the shaft 53. When the said shaft has been rocked far enough to close the movable jaw 52 upon the fixed jaw 51, said shaft may be further moved to carry the blade 16 past the inner face of the jaw 51, and thus cause it to cut off the doubled edge of the paper clamped by said jaws.

To operate the blade 16 of the supplement-cutting mechanism, a movable cam-segment, 37, is provided. This cam-segment is arranged to move laterally to and from the side frame, being properly guided by pins 115 115, that slide in the frame, and are properly moved by a driving-screw, 106, that is tapped through the cam-segment, and caused to turn without moving longitudinally by means of a holding-plate that bears upon a shoulder of said screw. This cam-segment is shown in Fig. 5 in its rearward position, where the arm 56 clears it, but may be moved inwardly into operative position, or so as to intercept the rock-arm 56 and force this arm to pass over it, so as to increase its rocking movement, which greater movement of the rock-arm causes the shaft 53 to continue to move after the jaw 52 has met the jaw 51, and to carry with it the blade 16, which is thus forced through the projecting folded edge of the paper nipped and held by the jaws 51 52, whereby the folded sheet is divided into two unfolded half-sheets, which remain within the grasp of the jaws. The blade 16, in the structure shown in Fig. 6, is caused to make a shear cut by means of an endwise movement given to it by inclined slots in the inner face of the outer plate of the jaw 52, into which the ends of the arms 98 protrude, said arms being loosely enough attached to the shaft 53 to admit of slight movement.

A modified form of supplement-cutter is shown at the upper portion of the cylinder B in Fig. 2, and in detail in Fig. 7, where, instead of using the jaw 51 as the cutting-edge, there is connected with said jaw a spring cutting-blade, 108, which, being fixed at one end only, and extending diagonally across the edge of the cutting-blade 16, and being a spring-blade, produces a shearing cut when the blade 16 is forced past it. The arms 56 are slotted at 114 to pass the end of the screw 106, when the cam-segment 37 is out of operative position.

In order to adapt this machine to impart to the once-folded sheets a second fold parallel to the first fold, the cylinder B is provided with pivoted or hinged folding-blades 29, which are shown as simple plates connected to a shaft, 67, and held in a closed position, or with their edges coincident, or nearly so, with the periphery of the cylinder B, as shown in Fig. 2, by means of a spring, 49. There are two of these blades at opposite points of the cylinder B, and each blade is provided with a rock-arm, 2, that is adapted to engage a stop or deflector, 70, at the extremity of a bar, 71, carried by an adjustable frame, which is mainly composed of side arms, 68 69, and an end bar, 72. This frame carries journaled in its arms 68 69 a pair of horizontal folding-rollers, 65 66, having pinions 76 77, gearing together, and adapted to be thrown into engagement with the teeth of the wheel 40 on the shaft 41 of cylinder B whenever it is desired to fold the sheets a second time. The arms 68 69 of this frame are pivoted to brackets 73, and the end bar, 72, of this frame carries spring locking-bolts 74, adapted to engage in one of the two sets of holes in brackets 75, to hold the folding-rollers up or down and the pinions in or out of engagement with the teeth of wheel 40. When this frame is lifted a cross-bar, 50, bears down on the arms 60, carrying the roller 28, and depresses that roller, as in Figs. 3, 4, so that it cannot rise under the action of the spring and press the ends of the sheet up against the lip 27. In the act of lifting this frame it vibrates a lever, 88, connected with a lever, 107, that slides a loose bevel-toothed hub, 86, into engagement with a bevel-wheel, 82, on a shaft, 83. The shaft 83 is rotated in this instance by means of crank-wheels, 84, carried fast on its ends, which are connected by rods with crank-wheels 85 on the shaft 31 of cylinder A; but many different devices or modes of connection might be employed instead of those shown.

The adjustable frame, when elevated, carries the stop or deflector 70 into the path of the rock-arms 2 of each of the hinged or pivoted folding-blades 29, and thus stops or detains each folding-blade, so as to cause its edge to turn outward from the cylinder B, and to bear against the sheet already once folded and fold it and press the fold it makes between the surfaces of the revolving folding-rollers 65 66, which then carry the paper away, folding it a second time and feeding it into a supporting-guide that is formed of a series of narrow upright plates, 78, that are flanged outward at their upper ends, as in Fig. 8, and provided at a suitable point with a seat or rest, 79. These guide-plates extend down between a vertically-arranged rotating folding-blade, D, and a vertically-arranged cylinder or carrier, I, the latter supporting devices which co-operate with said folding-blade D and operate with it to impart a fold to the sheet at right angles to its previous folds imparted by the mechanisms of the horizontally-arranged cylinders A B. This rotating folding-blade D is double—that is, it is composed of a shaft, *s*, armed with two folding-blades, 94, projecting in opposite directions, which blades are alternately brought into position. The shaft *s* of this rotating folding-blade is supported in proper bearings, and provided with opposite rock-arms, 95, adapted to be engaged by tappet projections 4, extending from opposite points of a toothed wheel, 93, that is fast on the lower end of the shaft 80 of the vertical cylinder or carrier I.

Holding-pins 96, projecting in opposite directions near the lower end of the shaft, rest on a double-inclined crown-cam, 97, which serves the purpose of turning the shaft *s* of the rotating folding-blade D to its normal position after each operation of it, thus completing its semi-revolution, the weight of the shaft *s* and the folding-blade being sufficient to cause the holding-pins 96 to ride down the inclined faces of the crown-cam 97. The shaft 80 of the vertical folding-cylinder I has at its bottom end a bevel-gear wheel, 81, that is engaged by the bevel-wheel 82 on the shaft 83. This vertical folding-cylinder I is provided with stationary nipping-jaws 10, movable nipping-jaws 17, that are held open by springs 19, and with hinged or pivoted folding-blades 15, that are held closed by springs 14, and provided with rock-arms 1, in like manner as are the hinged or pivoted folding-blades 29, carried by the cylinder B, a stop or deflector, 9, being engaged by such rock-arms, so as to throw the said hinged or pivoted folding-blade 15 outward between folding-rollers 58 59, mounted vertically in stationary bearings, whereby a second cross-fold is imparted to the previously once-cross-folded sheet. It will now be understood that the sheet, having two parallel transverse folds standing in the supporting-guide upon the seat or rest 79 and between the rotating folding-blade D and the vertical cylinder I, will, as that cylinder is rotated, be folded as follows: One of the stops or deflectors 4, engaging a rock-arm, 95, will so far rotate the folding-blade D that one of the blades 94 will press the sheet of paper outward toward the vertical cylinder and double or fold it into or between a set of open nipping-jaws, 10 17, the latter jaw properly closing by means of a rock-arm, 89, carried by its shaft, that engages a stationary cam, 90, fixed on a plate, 109, in which said shaft turns. The sheet thus doubled into and seized by the jaws 10 17 is carried around with the vertical folding-cylinder, said sheet being drawn from between the guide-plates 78, and by passing over the innermost one having its one portion folded back and laid upon its other portion, thus becoming folded a third time and at right angles to its previous folds. After the sheet is thus fairly seized by the jaws 17 10, the folding-blade 94, then being also within the embrace of said jaws, will be carried by them onward in its rotation after the tappet 4 has left its rock-arm 94. When this folding-blade reaches the position shown in Fig. 9 it will leave said jaws, (the jaw 17 grasping the fold of the sheet,) whereupon its holding-pins 96, which in this movement of the folding-blade have ridden up the inclines on one side of the crown-cam 97 and passed its highest points, will, under the weight of the blade and its shaft, descend the opposite inclines of said crown-cam until they rest in the lowest depressions of said cam, thus completing a semi-rotation of said folding-blade and causing it to stand in the position shown in Figs. 2, 4, and 8, where it clears the pathway of the sheet, descending into the vertical guide until it is again rotated by the repetition of its folding operation. As the thrice-folded sheet is carried onward by the rotation of the vertical folding-cylinder it is drawn past vertically-arranged folding-rollers 58 59, which are revolved in unison by gear-wheels 91 92, that engage with the toothed wheel 93. When the head of this sheet has passed a proper distance beyond the folding-rollers 58 59 the rock-arm *i* of a vibrating folding-blade, 15, will engage the stop or deflector 9, and thus turn said blade outward to force the sheet upon a fourth folding-line into the nip of the rollers 58 59, the rock-arm 89 passing off from the cam 90 at the proper instant to allow the spring-seated movable nipping-jaw 17 to open and release the sheet. The springs 14 restore the folding-blades 15 to their normal positions against the rear ends of the jaws 17 after said blades pass out from between the rollers 58 59. The sheet then passes through the rollers 58 59 and issues therefrom folded four times. In this instance such folded sheets are rapidly fed alternately into angularly-arranged packing-boxes 100, of proper dimensions to receive them. These packing-boxes are provided with packing-arms 25, that are vibrated by a rocking shaft, 103, at the lower end of which is a crank, 104, connected by a link, 110, with an eccentric strap, 111, embracing an eccentric, 105, on the shaft 80 of the vertical cylinder. The folded sheets emerge from the folding-rollers 58 59 alternately on opposite sides of the vibrating packer 25, and are by its movements carried before it into one or the other of the packing-boxes 100, being forced against movable packing-heads, as 101, that gradually slide rearward as the sheets accumulate. As each sheet is moved by this packer 25 into a box, 100, a stud, 12, projecting from its bottom member, 25, strikes the face of an inclined cam, 13, extending upward from a rock-arm, 113, fast to the lower end of a shaft, 102, to which spring-fingers 11, having right-angled ends, are hung, and moves the arm 113, thus swinging said fingers outward, so as not to obstruct the passage-way for the sheet being delivered. As the vibrating packer retreats its stud 12 passes behind the cam 13 of the spring-fingers, which then move forward and prevent the sheets from crowding backward. A counting mechanism may be connected with this packer to indicate the number of sheets delivered folded.

It will be seen by those conversant with mechanism that the mechanical details for operating the parts actively engaged to fold the paper and deliver it, as described, can be varied without departing from this invention, as equivalently operating, connecting, and driving mechanisms may be employed.

The principal element of the supplement-cutter is a blade carried by a sheet-nipping jaw and adapted to slide on or in said jaw, and in this part of my invention it will be observed that the blade is moved to sever the paper after the paper is grasped and held by the jaw, and that the jaw and cutter are both moved by the same shaft, the jaw, however, being connected with the shaft, so that the latter, with the blade, can move farther than the jaw. This feature of my invention could be carried out by many different connecting and operating devices other than those shown, which would be mere equivalents. So I do not limit this feature of my invention to the mechanism shown. The supplement-cutter might be placed in connection with the stationary jaw, and have mechanism arranged to operate it after the jaws have met and grasped the paper. Each fly 7 carried by the rotating cylinder B may be thrown out and into co-operation with the roller 28 by other devices than those shown and described. The part 27 of the sheet-holding mechanism might be hinged and arranged to be moved backward as the fly 7 presses the sheet downward, and then come forward over the ends of the sheet, like a hook, as the fly moves away. A spring bar or rod might take the place of the supporting-plate 87. Although a fly operating to seize the rear ends of the sheets and aid in arresting them is described herein, mechanism having such a mode of operation is not broadly claimed herein.

The following subjects-matter, also described herein, are disclaimed, for the reason that they are contained in an application made by me November 11, 1875: the combination of a rotating mechanism for printing a web of paper, a web-severing mechanism for dividing it into sheets, and a rotating sheet-folding mechanism; the combination of a mechanism for printing a web of paper, a mechanism for severing said web into sheets, a mechanism for controlling the severed end of the web and delivering it to the folding mechanism, and a rotating sheet-folding mechanism; a folding-blade mounted in a revolving carrier, in combination with folding-rollers, into whose nip or bite it doubles and delivers the sheet.

What is claimed is—

1. The combination, with the rotating cylinder or carrier B and the fly 7, pivoted thereto, of a sheet-holding mechanism, whereby the rear end of a sheet discharged from said cylinder or carrier is seized and arrested, all substantially as described.

2. The combination, with the cylinder or carrier B, cam 46, and stop 64, of the hinged blade or fly, its spring 47, and rock-arms 63 and 45, substantially as described.

3. The combination, with the cylinder or carrier B and nipping mechanism for holding the folded paper, of a support, as the plate 87, for pressing or laying the free ends of the sheet one upon the other, all substantially as described.

4. The combination, with the cylinder or carrier and a pivoted or hinged folding-blade, of a pair of folding-rollers and a stop or deflector to turn the folding-blade out from the cylinder or carrier and press or fold the paper into the nip or between the folding-rollers, substantially as described.

5. The combination, with the cylinder or carrier and a folding-blade pivoted or hinged thereto, of a pair of folding-rollers and guide-plates to receive the folded sheet delivered from said rollers, substantially as described.

6. The adjustable folding-roller-carrying frame, and locking devices adapted to retain the pinion of one of the folding-rollers into or out of engagement with the toothed wheel carried by the cylinder or carrier B, in combination with the vertical cylinder and its co-operating folding mechanisms, and with mechanism to engage the shaft of the vertical cylinder and drive the same, all substantially as described.

7. The cylinder or carrier B and a fold-nipping mechanism supported thereby, in combination with a supplement-cutter operating to sever the folded portion of the paper held by said nipping mechanism, all substantially as described.

8. The combination, with guide-plates adapted to receive the folded sheet from the horizontally-arranged folding mechanisms and sustain the same in position to be again folded, of a vertically-arranged rotating folding-blade, adapted in its operation to be projected through the guide-plates, and a vertically-arranged folding-cylinder carrying nipping-jaws that co-operate wit' said folding-blade, all substantially as described.

9. The horizontal cylinder or carrier and a hinged or pivoted folding-blade supported thereby, the frame carrying horizontal folding-rollers, and a deflector or stop for operating said folding-blade, in combination with the vertically-arranged rotating folding-blade, the vertically-arranged folding-cylinder, one set of its fold-nipping jaws, a hinged or pivoted folding-blade, and a pair of vertical folding-rollers, substantially as described.

10. The combination, with a movable nipping-jaw and its operating-shaft, of a supplement-cutting blade carried by the jaw and connected by arms to said shaft, and a spring connecting the arms of the jaw to the shaft, whereby the cutting-blade is adapted to move after the jaw comes to rest, substantially as described.

11. The horizontal rotating cylinder or carrier, provided with a folding-blade, 3, the companion rotating cylinder or carrier B, provided with a nipping mechanism that co-operates with said folding-blade to fold the paper at right angles to its length, and with a hinged or pivoted folding-blade, 29, that co-operates with horizontal folding-rollers in imparting a second fold to the paper parallel with its first fold, in combination with a vertically-arranged folding-cylinder provided with a set of nipping-jaws, and a vertically-arranged rotating folding-blade co-operating therewith to produce a fold at right angles to the preceding fold in the paper, all substantially as described.

12. The combination, with a cylinder or carrier, as A, supporting two folding-blades, 3, a companion cylinder or carrier, as B, supporting two sets of nipping-jaws, 51 52, and two hinged or pivoted folding-blades, 29, that co-operate with folding-rollers 65 66, of a rotating folder having two blades, 94, a rotating cylinder supporting two sets of nipping-jaws, 10 17, and two pivoted or hinged folding-blades, 15, that co-operate with folding-rollers 58 59, said devices operating to impart four folds to successive sheets, the last two of which folds shall be at right angles to the preceding folds, substantially as described.

13. The rotating cylinder or carrier and a hinged or pivoted folding-blade supported thereby, and the stop or deflector for actuating said blade and causing its co-operation with folding-rollers, in combination with the rotating folding-blade 94 and the cylinder carrying a set of nipping-jaws co-operating with said blade 94, substantially as described.

14. The combination, with the cylinder or carrier B and a set of its sheet-carrying nipping jaws, 51 52, of the hinged or pivoted fly 7 and a sheet-holding mechanism co-operating with said fly, all substantially as described.

15. The combination, with a rotating cylinder or carrier by which a sheet is supported, of a device for forcing the rear end of a sheet off from said cylinder or carrier, and a sheet-holding mechanism coacting therewith to arrest the forward movement of said sheet, all substantially as described.

16. The combination, with the cylinder B, the hinged or pivoted fly 7, its rock-arms 63 45, and the cam 46, of the stop 64, roller 28, and lip 27, substantially as described.

17. The folding-roller-carrying frame and locking devices adapted to retain the pinion of one of the horizontal folding-rollers into or out of engagement with the toothed wheel carried by the cylinder B, in combination with the vertical folding-cylinder and the rotating folding-blade co-operating with the folding-jaws carried thereby, all substantially as described.

18. The combination, with the cylinder B, a folding-blade carried by it, and folding-rollers, as 65 66, a set of nipping-jaws, 51 52, and their rock-arm 56, of the cam 57, composed of a fixed and an adjustable plate, whereby the period during which said jaws shall remain closed may be regulated, substantially as described.

19. The combination, with the jaws 51 52 and a supplement-cutter, 16, of the rock-arm 56, its actuating-cam, and an adjustable cam-segment, 37, substantially as described.

20. The combination, with the rotating cylinders or carriers A B, a folding-blade, as 3, nipping-jaws, as 51 52, and paper-holding pins 6, of a blade, as 5, and devices for swinging it outwardly, whereby the paper, when held by said nipping-jaws, has its leading end disengaged from the pins, all substantially as described.

21. The combination, with cylinders A B, of folding-blade 3, nipping-jaws 51 52, pins 6, plate 5, rock-arm 24, and tappet 23, substantially as described.

22. The combination, with a folding-blade, as 94, and its shaft *s*, of rock-arms, as 95, a tappet, as 4, pins 96, and a cam, as 97, having double inclines, substantially as described.

23. The combination, with the cylinder or carrier B, of a set of its nipping-jaws, 51 52, hinged or pivoted folding-blade 29, and the folding-rollers 65 66, substantially as described.

24. A rotating cylinder or carrier provided with nipping-jaws and a rotating folding-blade, in combination with folding mechanism, substantially as described, for producing the preceding fold in the paper, the rotating nipping-jaws and rotating folding-blade being arranged at right angles to the mechanism for producing the preceding fold, substantially as described.

25. The combination, with rotary mechanisms for producing a primary fold, of a rotating folding-blade, as 94, a cylinder or carrier provided with nipping-jaws co-operating with said folding-blade to produce a fold in the sheet, said cylinder or carrier being also provided with a folding-blade, as 15, co-operating with sheet-seizing devices to produce another and parallel fold in the sheet, said mechanisms for producing the primary fold being arranged at right angles to said rotating folding-blade, cylinder or carrier having nipping-jaws and folding-blade, and the co-operating sheet-seizing devices, all substantially as described.

26. The combination of the cylinder or carrier A, supporting a folding-blade, and cylinder or carrier, B, supporting nipping-jaws, with the rotating cylinder I, carrying nipping-jaws 10 17, and a rotating folding-blade, 94, arranged at right angles to the cylinders or carriers A B, and their folding devices, and with sheet-conveying devices leading from one set of the folding mechanisms to the other, all substantially as described.

27. The combination of the rotating folding-blade 94 and rotating cylinder provided with a set of nipping-jaws, 10 17, and the sheet-guiding plates 78, substantially as described.

28. The combination of a cylinder or carrier provided with nipping-jaws, as 10 17, an independent rotating folding-blade, as 94, and feeding mechanism whereby the sheets may be fed in between the ends of the folding-blade and cylinder and in a direction parallel to their shafts, all substantially as described.

29. The combination of a rotating folding-blade, as 94, a cylinder provided with nipping-jaws, as 10 17, and a roller, as 59, with mechanism for producing the preceding fold in the paper, the folding-blade and cylinder with nipping-jaws being arranged at right angles to the mechanism for making the preceding fold, and caused to rotate, all substantially as described.

30. In combination with a cylinder or carrier provided with nipping-jaws, as 10 17, a rotating folding-blade, as 94, carried by a shaft, and turning out of contact with the cylinder or carrier with which said blade co-operates in folding the sheet, in order that a sheet of paper may have an open space to enter past the blade shaft or edge of the folding-blade and pass longitudinally between it and the nipper-jaw cylinder at any time during the rotating movement of the folding-blade when the blade is not in contact with the cylinder, all substantially as described.

31. The combination of the following three sets of mechanisms, viz: first, a rotating cylinder or carrier provided with a folding-blade; second, a rotating cylinder or carrier provided with sheet-nipping devices and a folding-blade; and, third, sheet-seizing devices which co-operate with the last-named folding-blade, the coaction of said mechanisms being such as to impart two parallel folds to a sheet passing once through them, all substantially as described.

32. The combination, with the vertical folding-rollers 58 59, of the packer 25 and horizontally-inclined packing-boxes 100, substantially as described.

33. The combination, with the packer 25 and a packing-box, 100, and packing-head 101, of the spring-fingers 11, rock-arm 113, cam 13, and tappet 12, substantially as described.

34. The combination, in a folding-machine, with the cylinder carrying the folding-blade and the paper or sheet to be folded, of rollers for making the fold, and a folding-blade projected from the cylinder at the proper time for introducing the fold-line of the sheet between the rollers, substantially as described.

In testimony whereof I have hereunto set my name this 3d day of July, 1879.

LUTHER C. CROWELL.

Witnesses:

FREDERICK P. FISH,

B. WADLEIGH.